Sept. 18, 1951 J. Y. DAHLSTRAND ET AL 2,568,275
POWER TRANSMISSION UNIT
Filed Nov. 24, 1948 3 Sheets-Sheet 1
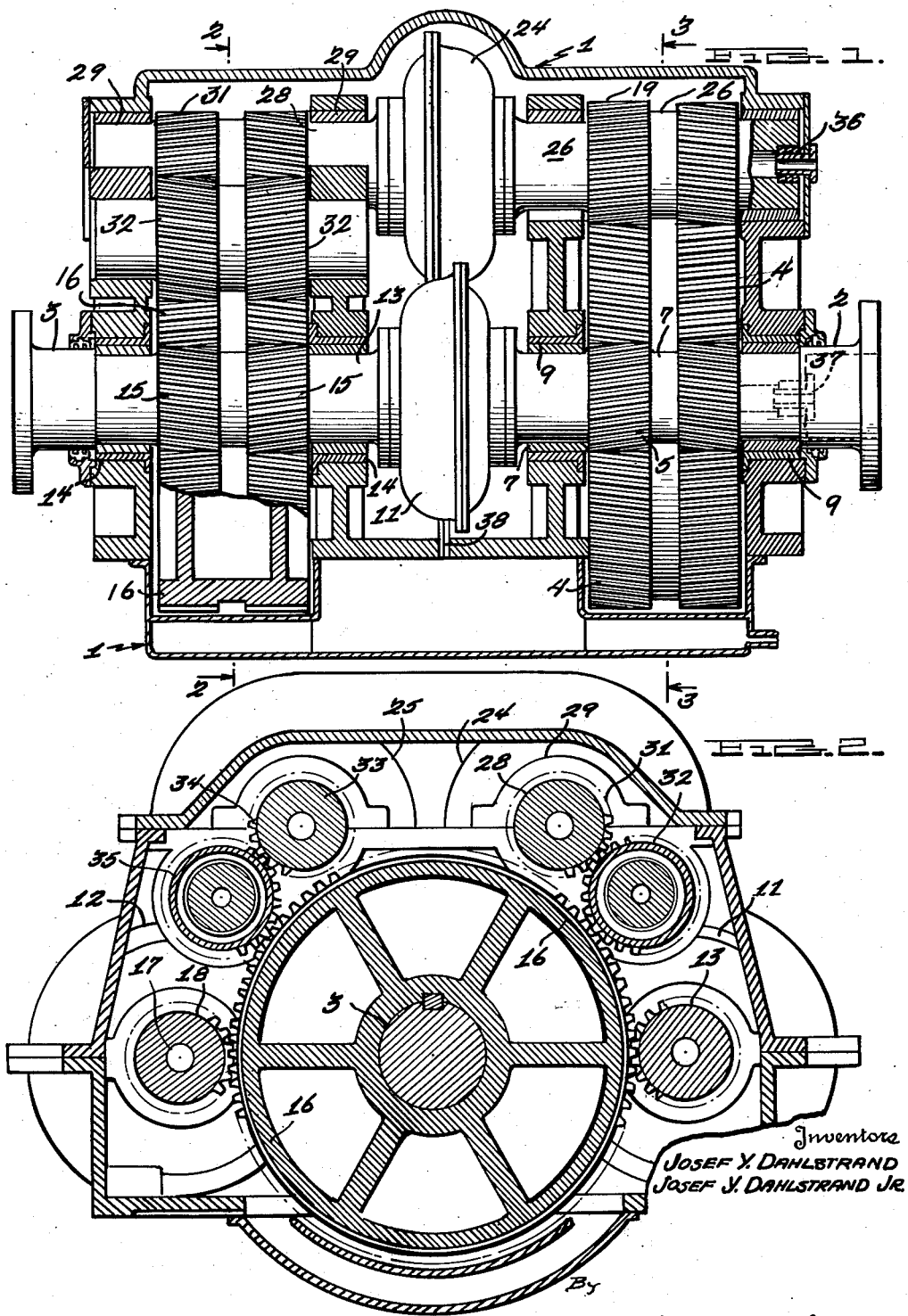
Inventors
JOSEF Y. DAHLSTRAND
JOSEF Y. DAHLSTRAND JR.

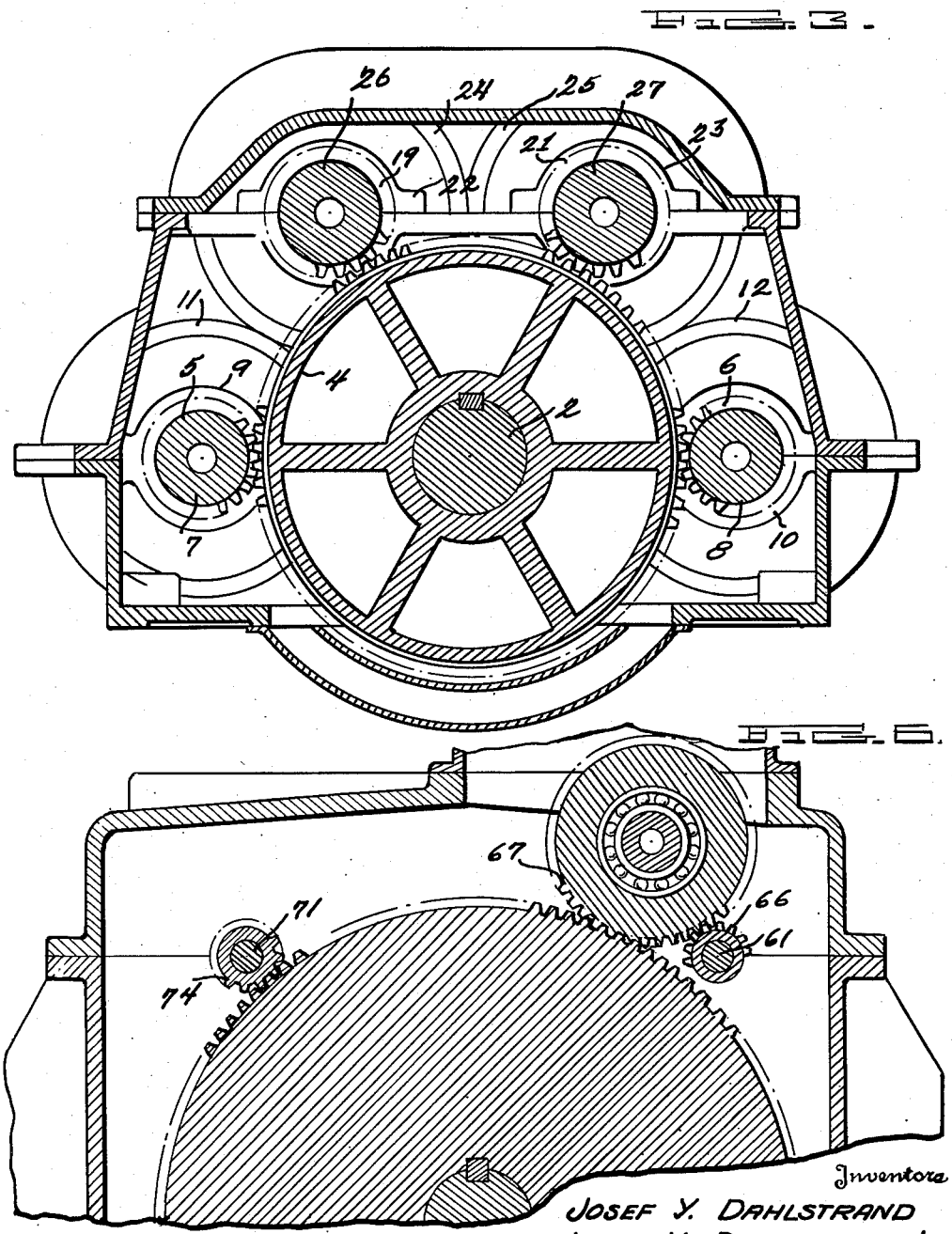

Sept. 18, 1951  J. Y. DAHLSTRAND ET AL  2,568,275
POWER TRANSMISSION UNIT
Filed Nov. 24, 1948  3 Sheets-Sheet 3
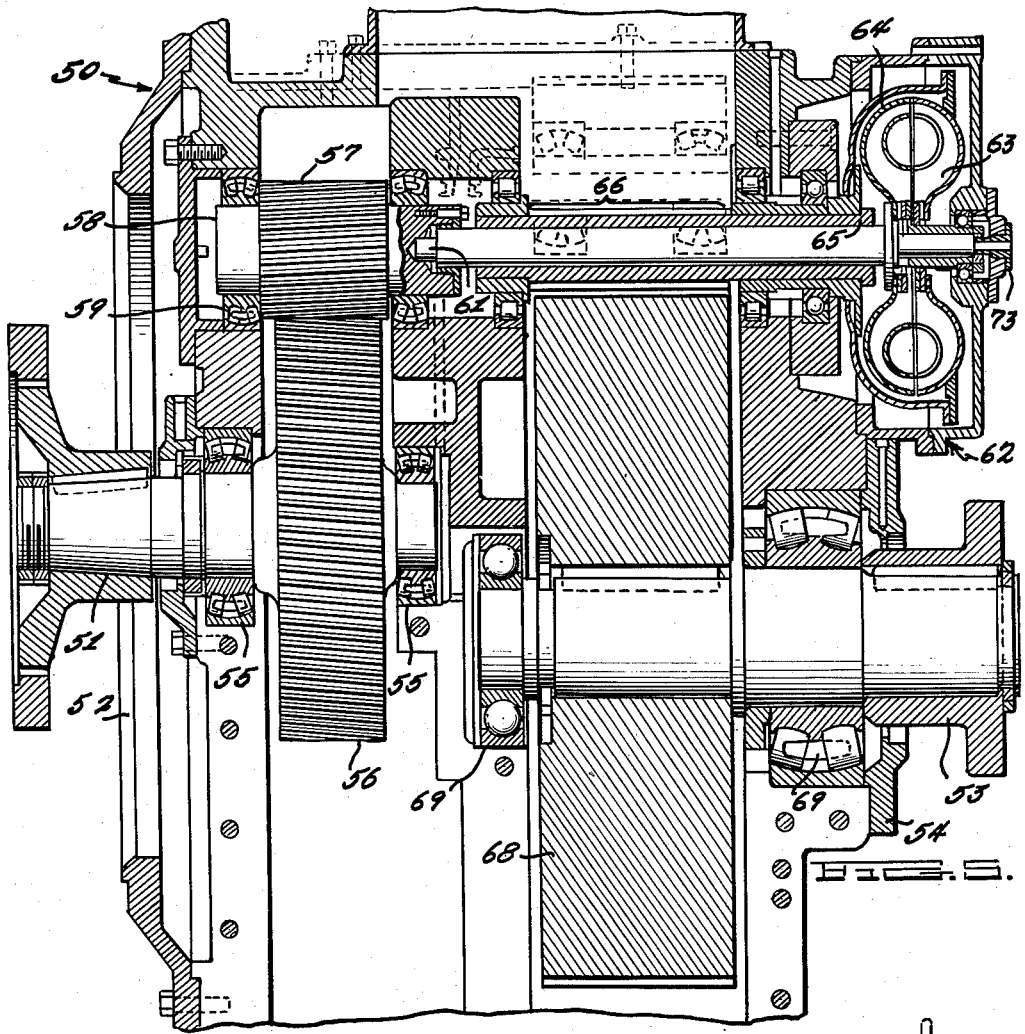
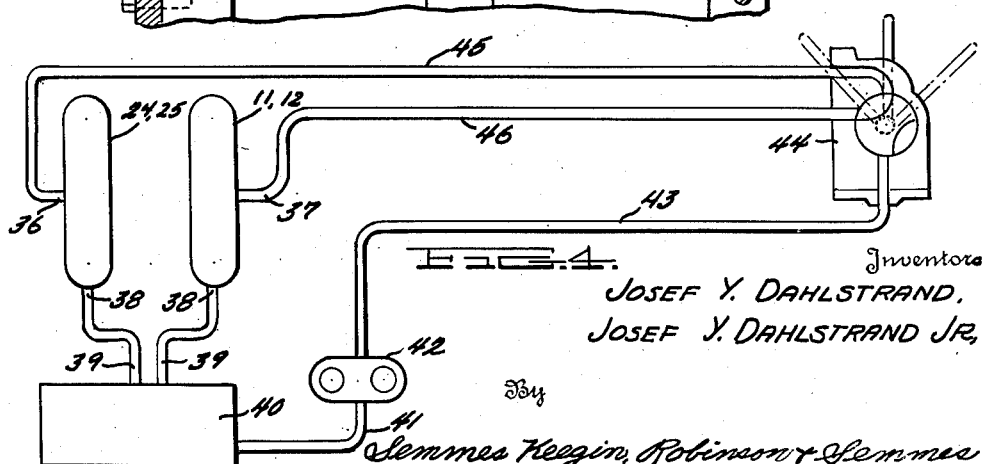
Inventors
JOSEF Y. DAHLSTRAND,
JOSEF Y. DAHLSTRAND JR,
By
Semmes Keegin, Robinson & Semmes
ATTORNEYS Patented Sept. 18, 1951

2,568,275

UNITED STATES PATENT OFFICE 2,568,275

POWER TRANSMISSION UNIT

Josef Y. Dahlstrand and Josef Y. Dahlstrand, Jr., Indianapolis, Ind.

Application November 24, 1948, Serial No. 61,852

3 Claims. (Cl. 74—361)

This invention relates to power transmission apparatus and more particularly to a reversible gear drive unit.

In the operation of many types of machinery it is necessary to reverse the direction of rotation of machinery quickly from a high speed in one direction to a high speed in the reverse direction. Ordinarily, the machinery is driven by a motor which may not be reversed. The reversal of the direction of rotation causes extremely high shock loads, severely stressing the gear teeth, bearings, and shafts of the machinery. These stresses have been relieved to some extent by the use of friction and electrical couplings. The friction units, of course, are subject to rapid wear with the attendant high maintenance costs while the electric couplings are always subject to short-circuits with the dangers resulting therefrom.

It is an object of this invention to provide a power transmission unit allowing rapid and smooth reversal in the direction of rotation of the power output of the unit.

Another object of this invention is to isolate the motor supplying the power to the transmission unit from torsional vibration and shock loads originating from the equipment driven by the transmission unit.

A further object of this invention is to provide a power transmission unit having a high efficiency.

It is also an object of this invention to provide a power transmission unit in which the power is transferred from the driving means to the driven means at a low torque.

Another object of this invention is to provide a reversible power transmission unit providing a reduction in the revolutions per minute at the output from that of the input.

Still another object of this invention is to provide a power transmission unit in which there is a uniform distribution of the load on the driving gears.

With these and other objects in view, this invention resides in a spur gear driven by the source of power engaging driving pinions of reduced diameter. The pinions drive the power input side of forward and reversing hydraulic couplings at an increased rate whereby the torque to which those couplings are subjected is decreased for a given rate of power transmission. The driven turbine elements of the hydraulic couplings rotate shafts on which power output pinion gears are secured. The power output pinion gears driven by the forward hydraulic couplings engage a spur gear mounted on the output shaft of the transmission unit and the power output pinion gear driven by the reversing coupling engages an idling gear which in turn engages the output spur gear. Hydraulic fluid connections to the hydraulic couplings are provided for the selective introduction of hydraulic fluid to and drainage from the couplings. Reversal of the direction of rotation of the power output shaft is attained by changing the loading of the hydraulic couplings by the introduction of the fluid into one of the couplings and the drainage of the fluid from the other.

In the drawings:

Figure 1 is a longitudinal view of the preferred form of the power transmission unit comprising this invention;

Figure 2 is a cross-sectional view along the section line 2—2 of Figure 1 of the output gearing of the transmission unit;

Figure 3 is a cross-sectional view along the section line 3—3 in Figure 1 of the power input end of the transmission unit;

Figure 4 is a diagrammatic plan of the hydraulic connections employed in this invention for the introduction of hydraulic fluid to the hydraulic couplings to obtain engagement between the input and output shafts of the transmission unit;

Figure 5 is a cross-sectional view along the section line 5—5 in Figure 6 of a modified form of the invention; and Figure 6 is a cross-sectional view along the section line 6—6 in Figure 5 of the power output gears in the modified form of this invention.

This invention will be described herein, for purposes of illustration only, as applied to a drive for a propeller shaft of a ship. Clearly, this invention may be used advantageously in various other applications, and is not to be limited to marine purposes. Referring to Figure 1 of the drawings, the transmission unit is illustrated having a housing, indicated generally by 1, from which a power input shaft 2 and a power output shaft 3 extend. The power input shaft 2 is connected by any suitable means to the driving engine supplying the power. Inas-much as the power transmission unit of this invention is adapted to reverse the rate of rotation of the power output shaft, the power input shaft 2 will ordinarily be connected with a non-reversible engine.

Keyed on the input shaft 2 within the housing 1 is a driving or power input gear 4. The driving gear 4 is preferably of large diameter and has gear teeth around its periphery for engagement with forward driving pinions 5 and 6. The driving pinions 5 and 6 turn on input pinion shafts 7 and 8, respectively, which rotate in suitable bearings 9 and 10 supported by the housing 1. Input pinion shafts 7 and 8 extend toward the power output end of the transmission unit into conventional hydraulic couplings 11 and 12 to turn the pump elements in the couplings. Couplings 11 and 12 provide flexible power transmission means between the power input shaft and power output shaft for driving the output shaft in a forward direction.

A forward driven pinion shaft 13, mounted for rotation in suitable bearings 14, extends into the hydraulic coupling 11 and is attached to a conventional turbine element in the coupling. Forward driven pinion gears 15 are mounted on shaft 13 and engage a spur gear 16 keyed to the output shaft 3 of the transmission unit. A similar driven pinion shaft 17 extends from the output face of the hydraulic coupling 12 and drives forward driven pinion gears 18 which engage the spur gear 16.

Referring to Figure 3, reversing input pinion gears 19 and 21 are rotatably supported in bearings 22 and 23, respectively, for engagement with the driving gear 4. Pinion gears 19 and 21 drive conventional hydraulic couplings 24 and 25, respectively, through shafts 26 and 27 for the transmission of power to drive the shaft 3 in the reverse direction. The pump element of the hydraulic transmission couplings 24 and 25 are operatively connected with shafts 26 and 27 and driven thereby.

A reversing driven pinion shaft 28 driven by the turbine element in the hydraulic coupling 24 is rotatably mounted in bearings 29 at the output end of the transmission unit. A reverse output pinion gear 31 is mounted on shaft 28 in a position to engage an idling gear 32, which in turn engages the spur gear 16. In a similar manner, a shaft 33, on which a reversing pinion gear 34 is mounted, is driven by the hydraulic coupling 25. The reverse pinion gear 34 engages an idling pinion gear 35 which in turn engages the spur gear 16. The provision of the idling gears 32 and 35 between the reversing pinion gears 31 and 34 and the spur gear results in the spur gear 16 rotating in a direction opposite that of the power input gear 4.

The power input pinion shafts 5, 6, 26, and 27 for the hydraulic couplings are drilled axially to form conduits 36 and 37 extending from the outer ends of the shafts to the hydraulic couplings. These conduits allow the introduction of a hydraulic fluid into the hydraulic couplings as required during the operation of the transmission unit. The hydraulic couplings are provided with outlets 38, of reduced diameter, see Figure 1, in their periphery for the removal of the fluid from the hydraulic coupling.

Referring to Figure 4 of the drawings, in which the flow plan of the hydraulic fluid is illustrated schematically, the outlets 38 communicate through conduits 39 with a hydraulic fluid reservoir 40. Conduit 41 connects the reservoir 40 with a pressure pump 42 adapted to circulate the hydraulic fluid from the reservoir 40 through the hydraulic couplings 11, 12, 24, and 25. The outlet of the pump 42 is connected by means of a conduit 43 with a three-way pilot valve illustrated diagrammatically and indicated by reference numeral 44. Supply lines 45 and 46 extend from the control valve 44 to the reversing hydraulic couplings 24 and 25 and the forward hydraulic couplings 11 and 12, respectively. By means of the pilot valve 44 the hydraulic fluid may be caused to flow selectively through the forward hydraulic couplings 11 and 12 or the reverse hydraulic couplings 24 and 25.

In operation, the input shaft 2 is driven by the engine supplying the motive power for the transmission unit. The rotation of the input shaft turns the driving gear 4, which engages the pinion gears 5, 6, 19, and 21 to rotate shafts 7, 8, 26, and 27, respectively. The rotation of shafts 7, 8, 26, and 27 in turn rotate the pump elements of the hydraulic couplings 11, 12, 24, and 25.

When the transmission unit is to be employed to drive the ship in a forward direction, the control valve 44 is set to deliver hydraulic fluid from the pump 42 through the conduit 46 to the hydraulic couplings 11 and 12. The hydraulic fluid in the hydraulic couplings 11 and 12 exerts a force through the turbine elements in the couplings turning the shafts 13 and 17 to rotate the gears 15 and 18. The gears 15 and 18 engage the spur gear 16 to rotate the output shaft 3 and drive the vessel in a forward direction. When the pilot valve is set for forward motion, the pump 42 will supply hydraulic fluid at a rate sufficient to maintain the proper amount of fluid in the couplings 11 and 12. However, the fluid in couplings 24 and 25 will drain through the outlets 38 and no power will be transmitted from the input pinion shafts 26 and 27 to the driven pinion shafts 28 and 33.

When it is decided to reverse the direction of travel of the ship, the control valve 44 is adjusted to pump the hydraulic fluid through the conduits 43 and 45 to the reverse hydraulic couplings 24 and 25 and prevent flow through the conduit 46. The closing of the conduit 46 allows the hydraulic fluid in the couplings 11 and 12 to drain through the opening 38 in the periphrey of those couplings to the reservoir 40, and the hydraulic couplings 11 and 12 are disengaged from the output side of the transmission unit. The hydraulic fluid passing through conduit 45 into the reverse hydraulic couplings drives the turbine elements in those couplings to rotate the reversing output shafts 28 and 33. The pinion gears 31 and 34 mounted on shafts 28 and 33 engage the idling gears 32 and 35 which drive the spur gear 16 in a reverse direction and thereby reverse the direction of the output shaft 3.

The outlet 38 in the hydraulic couplings while small are of sufficient size to drain the hydraulic fluid from the couplings in approximately five seconds when no additional fluid is being delivered to the couplings from the pump 42. Pump 42 has sufficient capacity to deliver the hydraulic fluid to the couplings at a higher rate than the fluid will be discharged through the outlets 38 to maintain effective engagement of the coupling to which the fluid is pumped. Thus, complete reversal of the direction of rotation of the output shaft may be obtained in approximately five seconds, the time required to disengage the forward hydraulic couplings 11 and 12 by the drainage of the hydraulic fluid therefrom.

The driving pinions 5, 6, 19, and 21 and the output pinions 13, 18, 28, and 34 are generally of small diameter in comparison with the driving gear 3 of the spur gear 16. In this manner, the actual power transmission in the hydraulic couplings from the power input to the power output is accomplished at high rates of rotation, thereby reducing the torque necessary for a given rate of power transmission. The use of hydraulic couplings permits a rather high rate of slippage within the coupling without wear on the coupling to provide a structure in which the output shaft may rotate at a speed greatly reduced from the rate of rotation of the input shaft. In this manner, the input of power to the transmission unit at a low torque at a high rate of rotation may be transmitted to the propeller of a ship at a low rate of rotation and a high torque.

It will be desirable, particularly in marine installations, to transmit the power to the spur gear 16 on the output shaft 3 through a plurality of pinion gears. In this manner, the tooth loadings on the gears may be greatly reduced, and the use of hydraulic couplings allows uniform distribution of the load on all pinions. Clearly, this invention is not limited to any particular number of pinion gears.

A modified form of this invention especially adapted for use in smaller units is illustrated in Figures 5 and 6 of the drawings. In this form of the invention, a saving in the space required for the power transmission unit is obtained by locating the hydraulic coupling outside of the housing of the transmission unit. The power is supplied to the hydraulic coupling by means of an elongated shaft and is returned from the coupling to the output shaft by means of a quill shaft surrounding the elongated shaft.

Referring to Figure 5, a transmission unit is shown having a housing indicated generally by 50. A power input shaft 51 extends from an input end 52 of the housing and a power output shaft 53 extends from an output face 54 of the housing. The input shaft 51 rotates in bearings 55 within the housing 50 to turn a driving gear 56 keyed to the shaft 51 which in turn drives a reversing pinion gear 57. Pinion gear 57 is mounted on a shaft 58 rotating in any suitable bearings 59. The shaft 58 has an elongated extension 61 adapted to rotate integrally therewith, protruding from its end nearest the output end 54 of the transmission unit, to a reversing hydraulic coupling, indicated generally by 62, mounted externally of the housing. Extension 61 drives the pump element 63 of the hydraulic coupling as the pinion gear 57 is rotated by the driving gear 56. The turbine element 64 of the hydraulic coupling 62 is secured to a quill shaft 65, concentric with extension 61 and enclosing that extension.

The outer surface of quill shaft 65 is geared in the region designated by reference numeral 66 for engagement with an idler gear 67 best illustrated in Figure 6 of the drawings. The idler gear 67 meshes with a spur gear 68 mounted on the output shaft 53 of the power transmission unit to drive the output shaft.

The driving gear 56 also engages a forward driving pinion gear, not shown, which in turn rotates an extension shaft 71, similar to extension 61, extending to the pump element of a forward hydraulic coupling not shown in the drawings. The turbine element of the forward hydraulic coupling drives a quill shaft 72, illustrated in Figure 6 of the drawings, which engages the spur gear 68 mounted on the output shaft 53.

The extensions 61 and 71, to which the pump element of a reverse and forward hydraulic coupling, respectively, are connected, have conduits 73 drilled axially in one end for the introduction of the hydraulic fluid into the hydraulic coupling. The conduits 73 are connected with a three-way pilot valve, pump, and hydraulic fluid reservoir similar to that illustrated in Figure 4 for the engaging and disengaging of the proper coupling in the manner described for the form of the invention illustrated in Figures 1 through 4. Reversing hydraulic coupling 62 and the forward hydraulic coupling are each provided with outlets for the drainage of hydraulic fluid from the coupling to disengage it.

The operation of the form of the invention illustrated in Figures 5 and 6 is similar to that of the preferred form of the invention. When the output shaft is driven in a forward direction, the driving gear 56 turns the forward driving pinion gear to turn the shaft 71. Shaft 71 operates through the forward hydraulic coupling to rotate the quill shaft 72 which engages the spur gear 68 to turn the output shaft 53 in a forward direction. During the forward operation of the transmission unit the pilot valve, corresponding to valve 44 in Figure 6, is regulated to supply the hydraulic fluid to the forward hydraulic coupling and to prevent flow of the fluid to the reversing hydraulic coupling 62. The outlet in the periphery in the reversing hydraulic coupling allows any hydraulic fluid in that coupling to drain therefrom and effectively disengage the reversing hydraulic couplings.

When it is desired to reverse the direction of rotation of the output shaft, the pilot valve is reversed to supply hydraulic fluid to the reversing hydraulic coupling 62 and stop the flow of the hydraulic fluid to the forward coupling. The hydraulic fluid in the forward coupling will then drain from the outlet provided in the peripheries of that coupling to disengage the forward coupling. The introduction of the hydraulic fluid into the reversing hydraulic coupling drives the turbine element of the coupling to rotate the quill shaft 66 and turns the reverse idling gear 67. The idling gear 67 then drives the output shaft 53 through spur gear 68 in the reverse direction.

While this invention has been described in detail with respect to a particular modification of the invention, it is to be understood that the concept of this invention is not limited to those details, but is determined by the scope of the appended claims.

We claim:

1. A reversing gear drive comprising an input shaft and an output shaft, a first hydraulic coupling mechanically connected to the input shaft through gearing adapted to increase the rate of rotation of the hydraulic coupling above that of the input shaft, a second hydraulic coupling mechanically connected to the input shaft through gearing adapted to increase its rate of rotation above that of the input shaft, said first hydraulic coupling being connected to the output shaft through gearing adapted to drive the output shaft at a lower speed than the coupling and in the same direction as the input shaft, said second hydraulic coupling being connected to the output shaft through gearing adapted to drive the output shaft at a lower speed than the coupling and in a direction opposite the rotation of the input shaft, and means for selectively introducing fluid into the first hydraulic coupling and second hydraulic coupling to control the direction of rotation of the output shaft.

2. A reversing gear drive comprising a power input shaft and a power output shaft, a driving gear mounted on the input shaft, a plurality of forward driving pinion gears engaging the driving gear, a plurality of forward hydraulic couplings each having an input shaft and an output shaft, each of said forward driving pinion gears mounted on a forward hydraulic coupling input shaft to transmit power to the coupling, said forward driving pinion gears having a small diameter relative to the driving gear to turn the hydraulic coupling input shafts at a high speed relative to the input shaft of the gear drive whereby the power is transmitted at a low torque, a forward driven pinion gear on the output shaft of each hydraulic coupling, a driven gear on the output shaft of the gear drive engaged by each forward driven pinion gear, said driven gear having a large diameter relative to the forward driven pinion gears whereby the speed of the output shaft of the gear drive is low relative to the speed of the output shaft of the forward hydraulic couplings, a plurality of reversing driving pinion gears of small diameter relative to the driving gear of the gear drive, a plurality of reversing hydraulic couplings each having an input shaft and an output shaft, each of said reversing drive pinion gears being mounted on an input shaft of a reversing hydraulic coupling to rotate the input shaft of the coupling at a high speed relative to the input shaft of the gear drive a reversing driven pinion gear on the output shaft of each of the reversing hydraulic couplings, idler gears engaging the reversing driven pinion gears and the driven gear on the output shaft of the gear drive, said reversing driven pinion gears having a small diameter relative to the driven gear on the output shaft, and means for selectively introducing fluid into the forward hydraulic coupling and reversing hydraulic couplings to control the direction of rotation of the output shaft.

3. A reversing gear drive comprising a power input shaft and a power output shaft, a driving gear mounted on the power input shaft, a forward driving pinion gear engaging the driving gear, a forward hydraulic coupling having an input shaft and an output shaft, said forward driving pinion gear being mounted on the input shaft of the forward hydraulic coupling to transmit power to the coupling, said forward driving pinion gear having a small diameter relative to the diameter of the driving gear to turn the hydraulic coupling input shaft at a high speed relative to the input shaft of the gear drive whereby the power is transmitted at a low torque, a forward driven pinion gear on the output shaft of the forward hydraulic coupling, a driven gear on the output shaft of the gear drive engaged by the forward driven pinion gear, said driven gear having a large diameter relative to the forward driven pinion gear whereby the speed of the output shaft of the gear drive is low relative to the speed of the output shaft of the forward hydraulic coupling, a reversing driving pinion gear of small diameter relative to the driving gear of the gear drive constructed and arranged to engage the driving gear of the gear drive, a reversing hydraulic coupling having an input shaft and an output shaft, a reversing driven pinion gear on the output shaft of the reversing hydraulic coupling, an idler gear engaging the reversing driven pinion gear and the driven gear on the output shaft of the gear drive, said reversing driven pinion gear having a small diameter relative to the driven gear on the output shaft and means for selectively introducing fluid into the forward hydraulic coupling and reversing hydraulic coupling to control the direction of rotation of the output shaft.

JOSEF Y. DAHLSTRAND.
JOSEF Y. DAHLSTRAND, Jr.

REFERENCES CITED

The following references are of record in the file of this patent:

UNITED STATES PATENTS

| Number | Name | Date |
| --- | --- | --- |
| 992,967 | Lever | May 23, 1911 |
| 1,151,762 | Day | Aug. 31, 1915 |
| 1,165,019 | Petersen | Dec. 21, 1915 |
| 1,682,593 | Bauer | Aug. 28, 1928 |
| 2,063,471 | Stedefeld | Dec. 8, 1936 |
| 2,103,791 | Pepper | Dec. 28, 1937 |
| 2,307,619 | Brewer | Jan. 5, 1943 |
| 2,400,830 | Kinnucan | May 21, 1946 |
| 2,443,313 | Gerst | June 15, 1948 |

FOREIGN PATENTS

| Number | Country | Date |
| --- | --- | --- |
| 238,021 | Switzerland | Sept. 17, 1945 |
| 399,133 | Germany | July 28, 1924 |
| 619,866 | Great Britain | Mar. 16, 1949 |